United States Patent
Tijssen

(10) Patent No.: US 9,523,189 B2
(45) Date of Patent: *Dec. 20, 2016

(54) WATER VAPOUR CONTROL, WHICH IS ARRANGED FACING THE INSIDE OF A BUILDING

(75) Inventor: Maria Hubert Pierre Tijssen, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/235,871

(22) PCT Filed: Jul. 3, 2012

(86) PCT No.: PCT/EP2012/062893
§ 371 (c)(1),
(2), (4) Date: May 9, 2014

(87) PCT Pub. No.: WO2013/017357
PCT Pub. Date: Feb. 7, 2013

(65) Prior Publication Data
US 2014/0230355 A1 Aug. 21, 2014

(30) Foreign Application Priority Data
Aug. 2, 2011 (EP) .................... 11176300

(51) Int. Cl.
*E04B 5/00* (2006.01)
*E04B 1/62* (2006.01)
(Continued)

(52) U.S. Cl.
CPC ............... *E04B 1/625* (2013.01); *B32B 27/08* (2013.01); *B32B 27/34* (2013.01); *B32B 27/36* (2013.01);
(Continued)

(58) Field of Classification Search
CPC ......... E04B 1/665; E04B 1/625; E04D 12/002
(Continued)

(56) References Cited

U.S. PATENT DOCUMENTS 3,900,102 A * 8/1975 Hurst .................... C09J 7/0271
156/71
4,172,830 A * 10/1979 Rosenberg ................ E04D 5/10
156/249
(Continued)

FOREIGN PATENT DOCUMENTS

JP 11-504088 4/1999
JP 2008-510640 4/2008

OTHER PUBLICATIONS

Alex Wilson, SafeTouch Polyester Batt Insulation from Dow, Feb. 11, 2010, Building Green, Green Spec Insights https://www2.buildinggreen.com/blogs/safetouch-polyester-batt-insulation-dow?.*
(Continued)

*Primary Examiner* — Joshua J Michener
*Assistant Examiner* — Keith Minter
(74) *Attorney, Agent, or Firm* — Nixon & Vanderhye P.C.

(57) ABSTRACT

Water vapor control, which is arranged facing the inside of a building, comprising a first layer having a water vapor diffusion resistance (sd-value) of 1-5 meters diffusion-equivalent air space width, measured at a relative humidity of an atmosphere surrounding the layer of 30-50%, and having a Sd-value of <1 meters diffusion-equivalent air space width, measured at a relative humidity of 60-80%, and a second layer having a Sd-value of >0.6 meters diffusion-equivalent air space width, measured at a relative humidity of 80-100%.

5 Claims, 4 Drawing Sheets

(51) Int. Cl.
*E04D 12/00* (2006.01)
*E04B 1/66* (2006.01)
*B32B 27/34* (2006.01)
*B32B 27/36* (2006.01)
*B32B 27/08* (2006.01)

(52) U.S. Cl.
CPC ............ *E04B 1/665* (2013.01); *E04D 12/002* (2013.01); *B32B 2250/02* (2013.01); *B32B 2307/7265* (2013.01); *B32B 2367/00* (2013.01); *B32B 2377/00* (2013.01); *B32B 2419/00* (2013.01)

(58) Field of Classification Search
USPC ............................ 52/408, 409, 410, 411, 412
See application file for complete search history.

(56) References Cited

U.S. PATENT DOCUMENTS

| | | | | |
|---|---|---|---|---|
| 4,215,160 A | * | 7/1980 | Rosenberg | E04B 1/66 118/69 |
| 4,751,122 A | * | 6/1988 | May | C09J 7/045 428/192 |
| 4,994,328 A | * | 2/1991 | Cogliano | C09J 7/026 156/71 |
| 5,254,661 A | * | 10/1993 | Wilson | E04B 1/66 428/141 |
| 5,316,848 A | * | 5/1994 | Bartlett | C09J 7/0246 428/351 |
| 5,496,615 A | * | 3/1996 | Bartlett | C09J 7/02 428/144 |
| 5,687,517 A | * | 11/1997 | Wiercinski | B32B 3/28 52/177 |
| 6,279,284 B1 | | 8/2001 | Moras | 52/408 |
| 6,335,083 B1 | * | 1/2002 | Kasai | C03C 12/02 106/419 |
| 6,500,520 B1 | * | 12/2002 | Wiercinski | C09J 7/021 428/144 |
| 6,514,892 B1 | * | 2/2003 | Kasai | C03C 12/02 428/323 |
| 6,808,772 B2 | | 10/2004 | Kunzel et al. | 428/35.4 |
| 6,986,229 B2 | | 1/2006 | Collison et al. | 52/384 |
| 2003/0215594 A1 | * | 11/2003 | Hamdar | B32B 3/08 428/40.1 |
| 2004/0103604 A1 | | 6/2004 | Kunzel et al. | 52/404.1 |
| 2005/0000183 A1 | | 1/2005 | Fay et al. | 52/506.01 |
| 2005/0014431 A1 | | 1/2005 | Carmody et al. | 442/76 |
| 2005/0196590 A1 | * | 9/2005 | Seth | B32B 25/04 428/174 |
| 2005/0255308 A1 | | 11/2005 | Gregg et al. | 428/312.4 |
| 2006/0040091 A1 | | 2/2006 | Bletsos et al. | |
| 2008/0152867 A1 | * | 6/2008 | Di Pede | B32B 3/085 428/141 |
| 2011/0185666 A1 | * | 8/2011 | Russell | B32B 7/12 52/408 |
| 2014/0013687 A1 | | 1/2014 | Paul et al. | 52/302.1 |
| 2014/0377519 A1 | * | 12/2014 | Rancich et al. | 428/212 |
| 2015/0052847 A1 | * | 2/2015 | Wiercinski et al. | 52/741.4 |

OTHER PUBLICATIONS

International Search Report for PCT/EP2012/062893, mailed Aug. 10, 2012.

U.S. Appl. No. 14/236,113, filed Jul. 3, 2012.

* cited by examiner

WATER VAPOUR CONTROL, WHICH IS ARRANGED FACING THE INSIDE OF A BUILDING

This application is the U.S. national phase of International Application No. PCT/EP2012/062893 filed 3 Jul. 2012 which designated the U.S. and claims priority to EP Patent Application No. 11176300.9 filed 2 Aug. 2011, the entire contents of each of which are hereby incorporated by reference.

FIELD

The invention relates to a water vapour control, which is arranged facing the inside of a building.

BACKGROUND AND SUMMARY

In order to reduce the carbon dioxide emission and use of mineral oil and gas for the heating of buildings, thermal insulation is applied during the construction of new buildings and in the renovation of old buildings. Thermal insulation layers are in general placed internally, for example in a wooden roof construction. To avoid draft and also to protect the insulation material and the wooden construction against moisture normally at both sides of the insulation layer vapour controls may be placed, often in the form of membranes. Nevertheless moisture may penetrate into the roof construction, for example because of leakages through joints of the vapour control.

The vapour control placed at the outside of the roof construction may be in the form of a so-called roofing membrane or underlay. This vapour control ensures that no water in the form of rain, fog or snow penetrates the roof construction. This vapour control is highly permeable for water vapour to ensure that under all circumstances water that accumulates in the roof construction can evaporate from the roof construction.

It is important that the vapour control, which is arranged facing the inside of the building in winter time allows no or only a limited quantity of moisture to diffuse from the inside of the building into the insulation layers, where the moisture tends to condensate at the cold side of the insulation layers. During the summer however it is favourable if the vapour control, which is arranged facing the inside of the building is more permeable for water vapour to allow the insulation layers and the construction to dry from moisture by releasing the moisture also to the inside of the building.

For that reason in US-2004/0103604 a vapour control arranged at the inside of a building is proposed, which vapour control comprises a first layer having a water vapour diffusion resistance (Sd-value) of 2-5 meters diffusion-equivalent air space width, measured at a relative humidity of an atmosphere surrounding the layer of 30-50%, and having a Sd-value of <1 meters diffusion-equivalent air space width, measured at a relative humidity of 60-80%. In this way the vapour control has a high permeability for water vapour in summer, when ambient humidity is high and it has a low permeability for water vapour in winter time, when ambient humidity is normally low. A good example of a vapour control that fulfils these conditions is simply a polyamide film, since the diffusion constant of polyamide for water increases under humid conditions, due to the high water uptake of polyamide.

A problem however may occur where for example a kitchen or a bath room is present facing the vapour control. Because of the relatively high ambient humidity in such a room yet a high water transport takes place through the vapour control from the inside of the building, also in winter. This is of course especially true if ventilation is poor and the use of the kitchen or bathroom is intensive. The water easily condenses in the isolation material and the roof construction and because of this fungi and rot may develop, causing bad smell and also damage of the roof construction.

Objective of the invention is to provide a vapour control that does not show this problem any more, while keeping enough capability to transport moisture to dry the insulation layers and the construction.

Surprisingly this objective is obtained by a vapour control arranged at the inside of a building is proposed, which vapour control comprises a first layer having a water vapour diffusion resistance (Sd-value) of 1-5 meters, preferably 2-5 meters diffusion-equivalent air space width, measured at a relative humidity of an atmosphere surrounding the layer of 30-50%, and having a Sd-value of <1 meters diffusion-equivalent air space width, measured at a relative humidity of 60-80%, comprising a second layer having a Sd-value of >0.2 meters diffusion-equivalent air space width, measured at a relative humidity of 80-100%.

In this way especially the transport of water is prohibited from the inside of the building at places in the building where high relative humidity may be present, such as for example a bath room or a kitchen.

DETAILED DESCRIPTION

Figure 1:
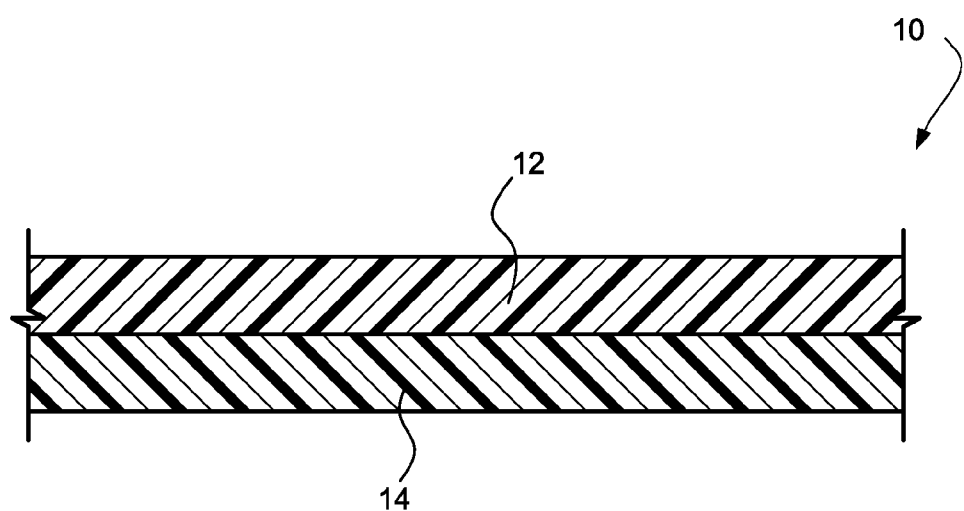
FIG. 1 is a schematic cross-sectional representation of a two-layer vapour control according to an embodiment of the invention.

The accompanying FIG. 1 schematically represents a vapour control 10 according to an embodiment of the invention having a first layer 12 and a second layer 14.

Preferably the Sd-value of the second layer 14 is >0.4, more preferably >0.6, more preferably >0.8, more preferably >1.0 meters diffusion-equivalent air space width, measured at a relative humidity of 80-100%. Even more preferably the Sd-value of the second layer 14 is >1.2 meters diffusion-equivalent air space width, measured at a relative humidity of 80-100%. Good results are obtained if the Sd-value of the second layer 14 is <3, preferably <2 meters diffusion-equivalent air space width, measured at a relative humidity of 80-100%. This is because than still a sufficient transport may take place under humid conditions from the insulation layers into the building, while at places where a high relative humidity may be present in the building no problems occur with too much transport of water in the opposite direction.

The Sd value of a layer is measured at a single layer film of the same thickness and the same composition as a layer of the vapour barrier control according to DIN EN ISO 12772:2001, at 23° C.

The Sd-value of a layer may be changed by the choice of material for the layer and the layer thickness. The Sd-value of the total vapour barrier is the result of the total construction of the vapour barrier.

It is possible to use for the first layer 12 a material that has no adequate strength itself, but which can be applied to a suitable carrier, for example as a coating. Examples of such materials include modified polyvinyl alcohol, dispersions of hydrophobic synthetic resins, as well as methyl cellulose, linseed oil, alkyd resin, bone glue and protein derivatives. As carrier fiber spun fabrics, perforated polymer films, chip wood, paper etc. may be used.

Polyamide is preferably used as a material for the first layer 12 because a strong, self supporting layer may be produced, without the need of an extra carrier. Good examples of suitable polyamides include polyamide 6, polyamide 66, polyamide 46, polyamide 410 etc. Preferably polyamide 6 is used, because a very strong layer may be produced from the material and it is available in high quantities.

Preferably the material for the second layer 14 has a water vapour diffusion rate which is less dependant on the surrounding relative humidity than the material of the first layer. More preferably the vapour diffusion rate of the material of the second layer 14 is independent or at least essentially independent from the surrounding relative humidity.

Good examples of materials that may be used for the second layer include polyolefins, copolymers of olefins and vinyl esters, vinyl ethers, acrylates and methacrylates, polyesters, for example polyethylene terephthalate and polybutylene terephthalate, copolyester, for example thermoplastic elastomers comprising hard segments of polyester, especially the copolyetheresters, polyurethanes, polyacrylates, polymethacrylates, polyvinylacetates and copolymers comprising vinylacetate monomers. Suitably the layers of polymer are extruded films. Such films are monolithic films, what means that the films do not comprise any perforations or the like other than possible extrusion defects, like for instance pin holes. In this way a good working vapour barrier is obtained, with well-defined Sd values.

Preferably the vapour control 10 is a multi-layer film as shown in the Figure, which may be provided with an adhesive layer (not shown) between the first layer 12 and the second layer 14.

A suitable adhesive layer may be used between the first and the second layer, for example a maleic anhydride grafted polyolefin, for example YPAREX™ and NUCREL™ adhesives when polyolefins or copolymers of olefins and a further monomer or a polyurethane when a polyester or a copolyester is used.

More preferably the vapour control 10 contains or is a multi-layer film, preferably comprising a polyamide layer as the first layer 12 and a layer of a polyester or copolyester as the second layer 14, even more preferably with an adhesive layer (not shown) therebetween. Good results are obtained if the vapour control 10 contains a layer of a fleece, for example a polypropylene or a polyester fleece. Such a fleece provides extra strength to the vapour control and it improves the handling of the vapour control.

The invention will further be explained by the examples.
Materials Used:
Akulon™ F130, a polyamide 6, delivered by DSM, the Netherlands.
Arnitel™ PM460, a copolyesterether, delivered by DSM, the Netherlands.
Arnitel™ EM740, a copolyesterether, delivered by DSM, the Netherlands.
Arnitel™ CM551, a copolesthercarbonate, delivered by DSM, the Netherlands.
Arnitel™ 3106, a copolyesterether delivered by DSM, the Netherlands.
Arnitel™ Eco M700, a copolyester thermoplastic elastomer, containing hard segments of polyester and units of dimer fatty acid residues, delivered by DSM, the Netherlands.
Arnite™ T06 200, a polybuhylene terephthalate, delivered by DSM, the Netherlands.
Preparation Vapour Control.

Vapour controls comprising one layer of polyamide 6 (comparative experiment) or one layer of polyamide 6 and one or more layers of copolyester (examples) were prepared using a Collin™ multilayer cast film extrusion line.
Measuring the Water Vapour Diffusion Resistance of the Vapour Controls.

The water vapour diffusion resistance (Sd) of the vapour controls was measured according to DIN EN ISO 12572: 2001. The films were placed on top of a cup, as therein indicated. Tests were performed at 23° C. and at a relative humidity [RH] inside/outside the cup of 0/50% (average 25%), 0/95% (average 47.5%), 100/20% (average 60%), 100/50% (average 75%) and 100/95% (average 97.5%). The average of the two values is taken as the value for the relative humidity. For each vapour control measurements were performed, wherein the films were placed with the polyamide layer directed towards the side with the highest relative humidity.

Example 1

Figure 2:
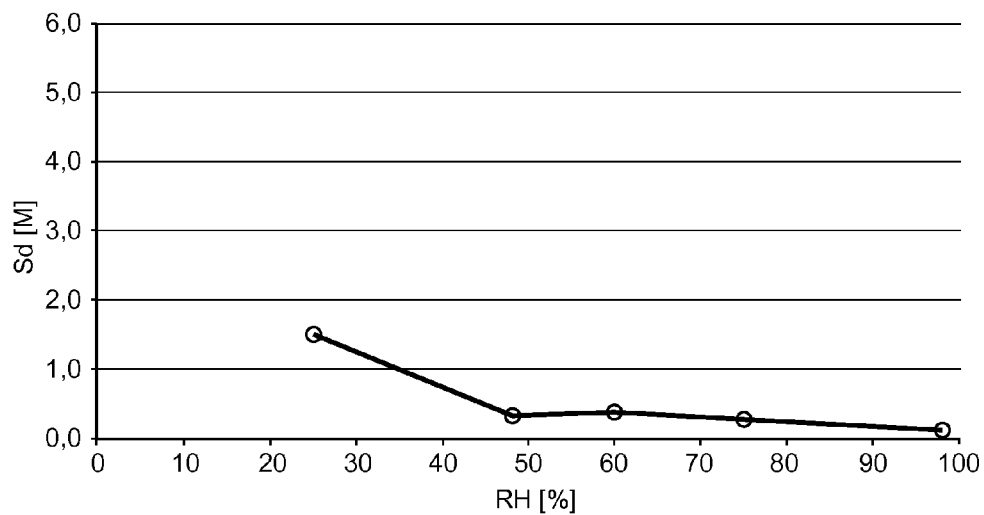
FIG. 2 is a graph of Sd values [M] versus relative humidity [%] obtained by Example 1 below.

The vapour control consists of
a first layer of Akulon™ F130, having a thickness of 25 microns and
a second layer of a blend of Arnitel PM460 and Arnitel CM551 in a ratio of 1:1, having a thickness of 15 microns.
The Sd-values of the vapour control are given in FIG. 2.

Example 2

Figure 3:
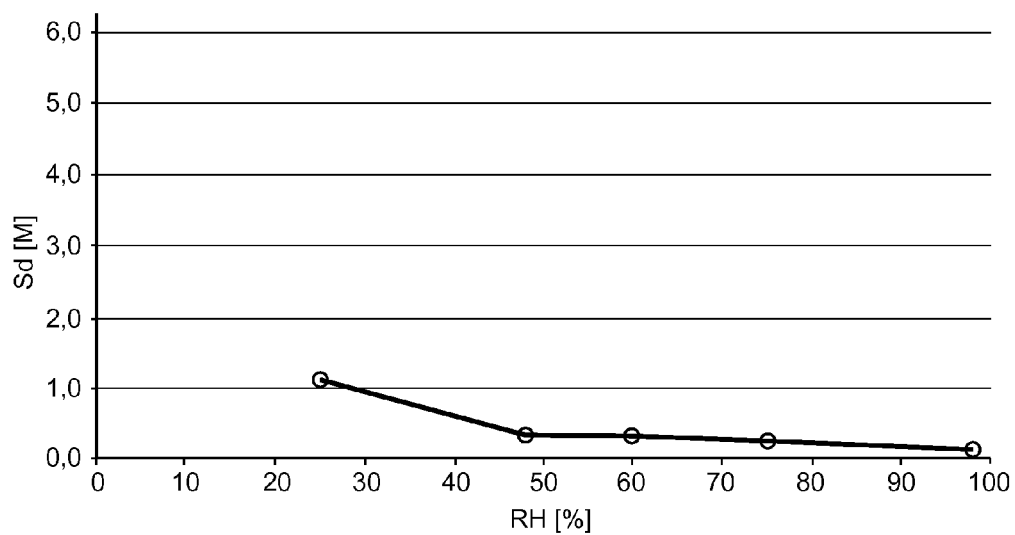
FIG. 3 is a graph of Sd values [M] versus relative humidity [%] obtained by Example 2 below.

The vapour control consists of
a first layer of Akulon™ F130, having a thickness of 15 microns and
a second layer of Arnitel 3106, having a thickness of 15 microns.
In between the first and the second layer a tie layer is present, consisting of a blend of Arnitel PM460 and Arnitel CM551 in a ratio of 1:1, having a thickness of 15 microns.
The Sd-values of the vapour control are given in FIG. 3.

Example 3

The vapour control consists of
a first layer of Akulon™ F130, having a thickness of 50 microns and a second layer of Arnitel Eco M700, having a thickness of 20 microns.

In between the first and the second layer a tie layer is present, consisting Arnitel CM551, having a thickness of 5 microns.

Figure 4:
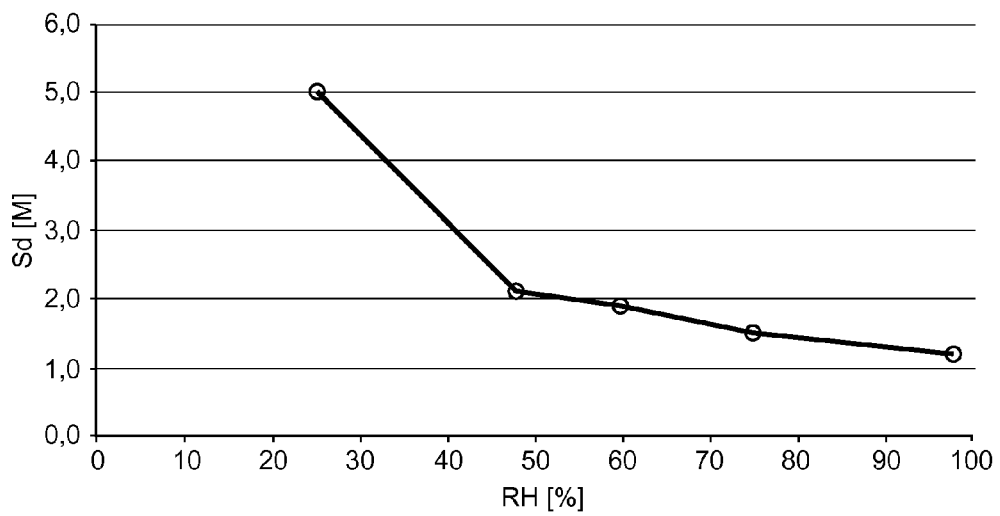
FIG. 4 is a graph of Sd values [M] versus relative humidity [%] obtained by Example 3 below.

The Sd-values of the vapour control are given in FIG. 4.

Example 4

The vapour control consists of a first layer of Akulon™ F130, having a thickness of 50 microns and a second layer of a blend of Arnite T06 200 and Arnitel CM551 in a ratio of 2:1, having a thickness of 25 microns.

Figure 5:
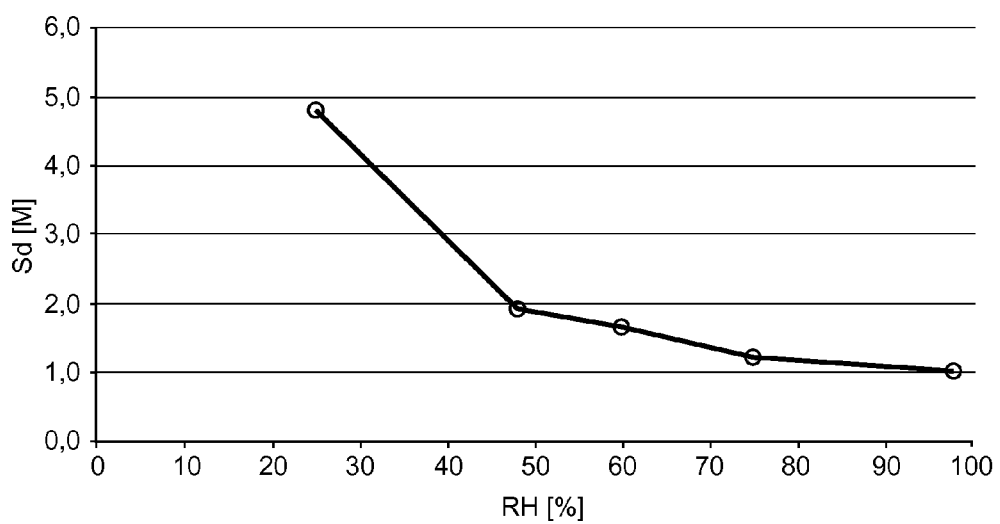
FIG. 5 is a graph of Sd values [M] versus relative humidity [%] obtained by Example 4 below.

The Sd-values of the vapour control are given in FIG. 5.

Comparative Experiment A

The vapour control consists of one single layer of Akulon™ F130, having a thickness of 50 microns. The Sd-values at the different relative humidity is given Graph 5.

Figure 6:
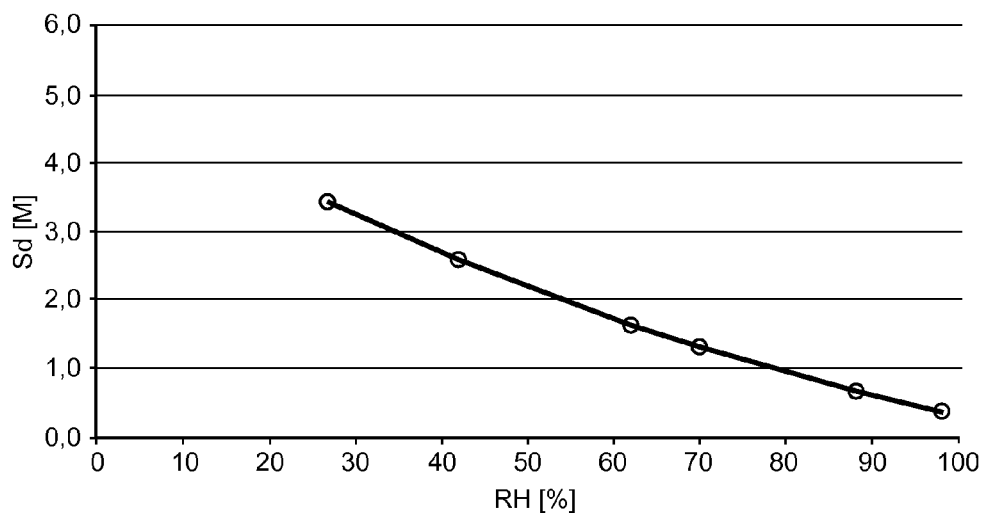
FIG. 6 is a graph of Sd values [M] versus relative humidity [%] obtained by Comparative Experiment A below.

From the comparison between comparative experiment A, FIG. 6 and the examples, FIGS. 2-5, it is clear that the water vapour diffusion resistance of the vapour barrier under high relative humidity is higher for the vapour barriers according to the invention. This is important to avoid diffusion from a room with a high RH into the roof construction.

Comparative Experiment B

Figure 7:
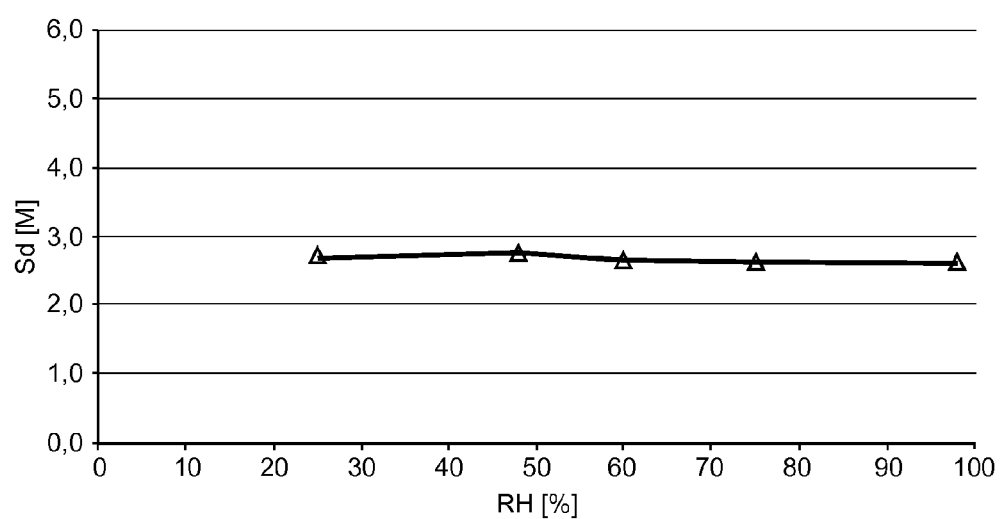
FIG. 7 is a graph of Sd values [M] versus relative humidity [%] obtained by Comparative Experiment B below.

The vapour control consists of a single layer of Arnitel™ EM740, having a thickness of 50 microns. The Sd values of the vapour control are given in FIG. 7.

The invention claimed is:

1. A multi-layer water vapour control film comprising a first film layer and a second film layer, wherein the first film layer is comprised of a polyamide film having a water vapour diffusion resistance (Sd-value) of 1-5 meters diffusion-equivalent air space width, measured at a relative humidity of an atmosphere surrounding the layer of 30-50%, and a Sd-value of <1 meters diffusion-equivalent air space width, measured at a relative humidity of 60-80%, and wherein the second film layer is comprised of a polyester film or copolyester film having a Sd-value of >0.2 meters diffusion-equivalent air space width, measured at a relative humidity of 80-100%.

2. The multi-layer water vapour control film according to claim 1, wherein the second film layer has a Sd-value of >0.4 meters diffusion-equivalent air space width, measured at a relative humidity of 80-100%.

3. The multi-layer water vapour control film according to claim 1, wherein the second film layer has a Sd-value of >0.8 meters diffusion-equivalent air space width, measured at a relative humidity of 80-100%.

4. The multi-layer water vapour control film according to claim 1, wherein the second film layer has a Sd-value of <3 meters diffusion-equivalent air space width, measured at a relative humidity of 80-100%.

5. The multi-layer water vapour control film according to claim 1, wherein second film layer is a copolyetherester film.

\* \* \* \* \*